(12) United States Patent
Avallone et al.

(10) Patent No.: US 7,610,800 B2
(45) Date of Patent: Nov. 3, 2009

(54) METHOD AND SYSTEM FOR COLLECTING CRANKSHAFT POSITION DATA

(75) Inventors: Xuan Dung T. Avallone, Milford, MI (US); John L. Lahti, Novi, MI (US); David S. Mathews, Howell, MI (US); Robert C. Simon, Jr., Novi, MI (US); Leonard G. Wozniak, Ann Arbor, MI (US); William R. Cawthorne, Milford, MI (US); Robert S Wickman, Westland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 88 days.

(21) Appl. No.: 11/847,109

(22) Filed: Aug. 29, 2007

(65) Prior Publication Data

US 2009/0056429 A1  Mar. 5, 2009

(51) Int. Cl.
*G01M 15/06* (2006.01)
(52) U.S. Cl. .................................. 73/114.26
(58) Field of Classification Search .............. 73/114.01, 73/114.26; 123/332, 406.18, 406.58, 406.62; 324/173, 174, 179, 207.25
See application file for complete search history.

(56) References Cited

U.S. PATENT DOCUMENTS

| | | | |
|---|---|---|---|
| 5,177,681 A * | 1/1993 | Sato ........................... 701/38 |
| 5,864,775 A * | 1/1999 | Bradshaw et al. ........... 702/104 |
| 6,453,864 B1 * | 9/2002 | Downs et al. ............ 123/179.3 |
| 6,588,404 B1 * | 7/2003 | Mathews ..................... 123/479 |
| 6,609,498 B2 * | 8/2003 | Mathews et al. ....... 123/406.62 |
| 6,752,009 B2 * | 6/2004 | Minich et al. ............. 73/114.27 |
| 6,834,632 B2 * | 12/2004 | Kataoka et al. .......... 123/179.4 |
| 6,877,470 B2 * | 4/2005 | Mitani et al. ............. 123/179.3 |
| 6,988,477 B2 * | 1/2006 | Kataoka et al. .......... 123/182.1 |
| 7,059,297 B2 * | 6/2006 | Kataoka et al. ............. 123/322 |
| 7,079,939 B2 * | 7/2006 | Kataoka et al. ............. 701/112 |
| 7,263,959 B2 * | 9/2007 | Kataoka et al. .......... 123/179.4 |
| 2003/0037607 A1 * | 2/2003 | Minich et al. .............. 73/117.3 |
| 2005/0115534 A1 * | 6/2005 | Tsuji et al. ............. 123/179.16 |
| 2008/0127935 A1 * | 6/2008 | Park ........................... 123/332 |

* cited by examiner

*Primary Examiner*—Lisa M Caputo
*Assistant Examiner*—Freddie Kirkland, III

(57) ABSTRACT

A method for collecting crankshaft position data includes rotating a crankshaft of an engine within a selected angular velocity range without any fuel being applied to the engine and measuring crankshaft position data.

20 Claims, 3 Drawing Sheets

METHOD AND SYSTEM FOR COLLECTING CRANKSHAFT POSITION DATA

TECHNICAL FIELD

This disclosure is related to an internal combustion engine crankshaft position sensing.

BACKGROUND

Combustion within an internal combustion engine is a time sensitive process in which the opening and closing of valves, fuel injection, and spark ignition must occur at precise times in relation to the stroke of the associated cylinder in order to meet emission, performance and efficiency objectives. Measuring crankshaft position is a known method to approximate cylinder positions. One method to measure crankshaft position is to link a target wheel to the crankshaft and sense the target wheel rotation. This target wheel includes features which allow individual revolutions of the wheel and fractions thereof to be sensed.

As already mentioned, timing is very important to the combustion process. Small manufacturing variations and dynamic system conditions may introduce errors crankshaft position measurements via a target wheel. These errors may compromise the combustion process, so it is therefore advantageous to quantify these errors and adapt to them. While a portion of these errors are driven by manufacturing variations that can be measured while the engine is stationary, the effects of the dynamic system forces interact with these manufacturing variations and may not be discounted. In addition, the system experiences additional deformations while in an acceleration mode, a deceleration mode, or while being driven by the combustion process.

SUMMARY

A method for collecting crankshaft position data includes rotating a crankshaft of an engine within a selected angular velocity range without any fuel being applied to the engine and measuring crankshaft position data.

BRIEF DESCRIPTION OF THE DRAWINGS

One or more embodiments will now be described, by way of example, with reference to the accompanying drawings, in which.

DETAILED DESCRIPTION

Figure 1:
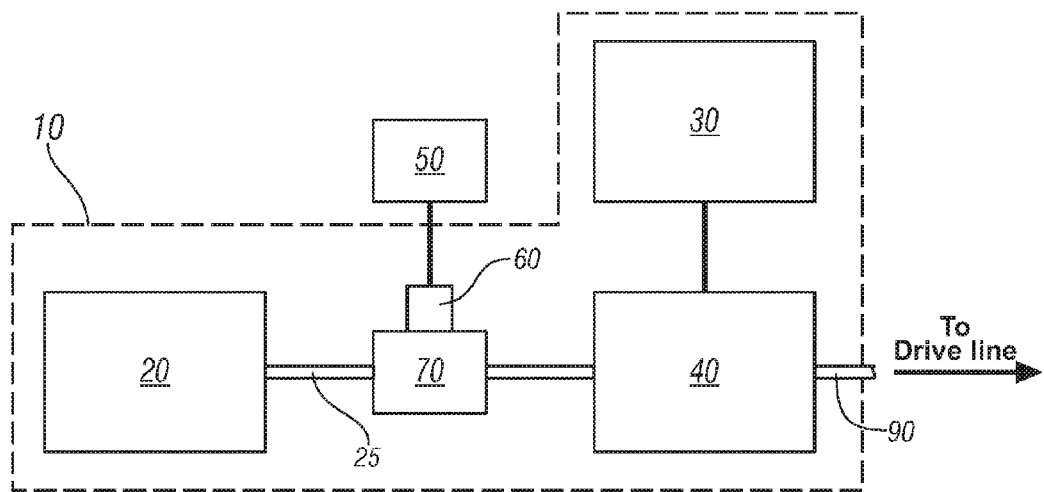
FIG. 1 is a schematic diagram exemplifying a hybrid drive system which has been constructed in accordance with the present disclosure.

Referring now to the drawings, wherein the showings are for the purpose of illustrating certain exemplary embodiments only and not for the purpose of limiting the same, FIG. 1 depicts a hybrid drive system 10 which has been constructed in accordance with an embodiment of the disclosure. The hybrid drive system 10 depicted includes an engine 20, a crankshaft 25, an electric motor 30, a transmission assembly 40, a target wheel assembly 70, a crankshaft position sensor 60, and an output shaft 90. Engine 20 and electric motor 30 operate in tandem with transmission assembly 40. Transmission assembly 40 may receive power from engine 20, motor 30, output shaft 90, or sub-combinations thereof; transmission assembly 40 may also transmit power to engine 20, motor 30, output shaft 90, or sub-combinations thereof. This embodiment of the disclosure provides power from motor 30 to engine 20 through transmission assembly 40 for the purpose of rotating crankshaft 25. Crankshaft 25 is a component of engine 20 which acts to transform power from and to pistons in the engine. This embodiment of the disclosure further incorporates a target wheel assembly 70 located in-line between engine 20 and transmission assembly 40; however, it should be appreciated that target wheel assembly 70 may be replaced by any device capable of quantifying the rotational position of crankshaft 25. Crankshaft position sensor ("sensor") 60 is positioned within target wheel assembly 70 such that sensor 60 may measure rotational data related to the position of crankshaft 25. Data collection module 50 is in communication with sensor 60 to collect any data gathered by sensor 60.

Figure 2:
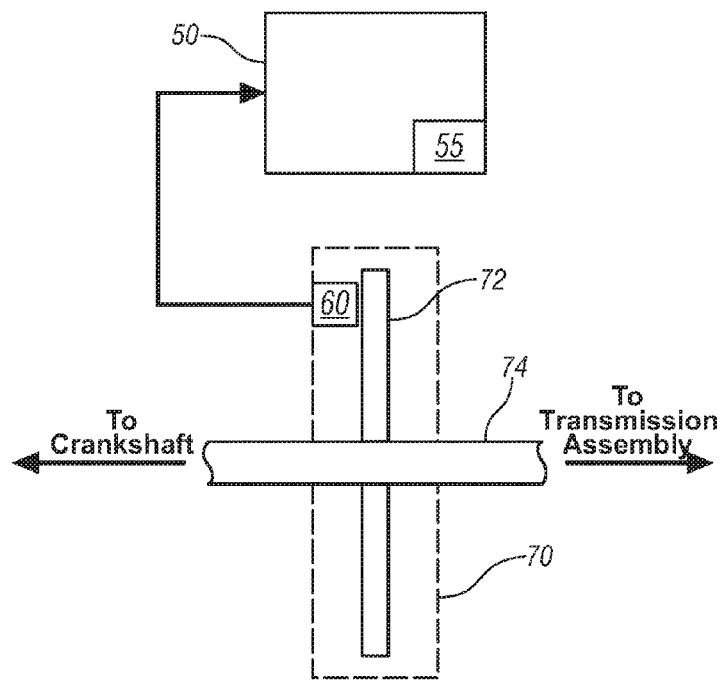
FIG. 2 is a schematic diagram of a sensing system accordance with the present disclosure.

FIG. 2 depicts the interaction between target wheel assembly 70, sensor 60, and data collection module 50 according to an embodiment of the disclosure. Data collection module 50 may contain a data processor 55, or it may simply contain or link to a port by which data may be collected by a device outside the system. Target wheel assembly 70 contains target wheel 72 connected to target wheel shaft 74. Target wheel shaft 74 is connected to transmission assembly 40 and crankshaft 25 in such a way that any rotation of crankshaft 25 creates a substantially matching or proportional rotation of target wheel 72.

Figure 3:
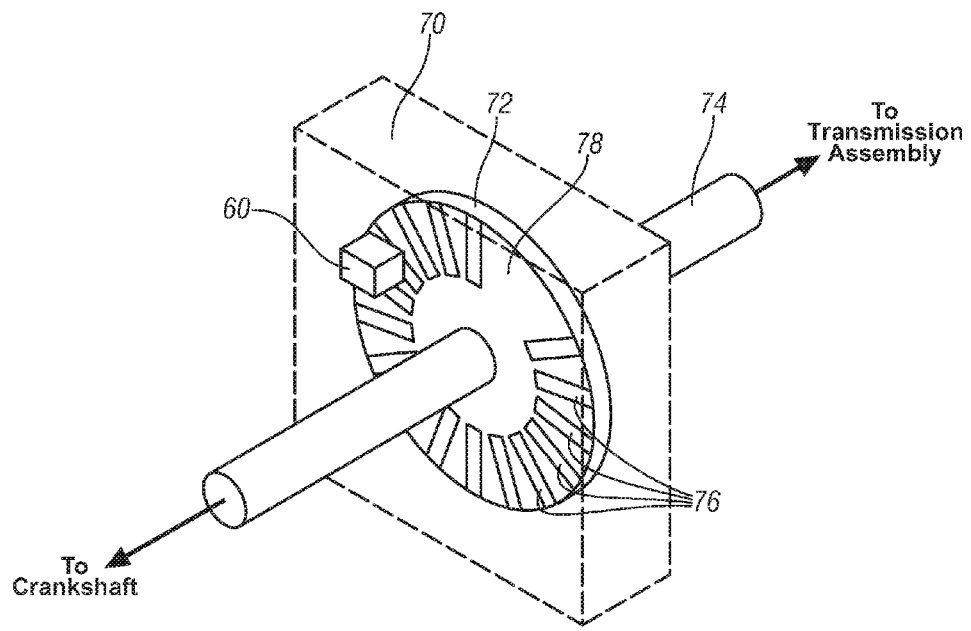
FIG. 3 is a perspective view of an exemplary sensing system target wheel/sensor complement in accordance with the present disclosure.

FIG. 3 depicts the internal workings of target wheel assembly 70 according to an exemplary embodiment of the disclosure. Sensor 60 interacts with target wheel 72, such that sensor 60 may gather detailed data regarding each rotation of target wheel 72. This particular embodiment of the disclosure illustrates the use of a plurality of target wheel raised indicators 76 in conjunction with a magnetic crankshaft position sensor 60. Magnetic sensors may be used to detect a change in metallic mass located proximately to the sensor. As the wheel rotates, each individual raised indicator 76 creates an impulse in sensor 60, and that impulse is relayed to data collection module 50. Target wheel 72, in this particular embodiment, incorporates a blank section 78 where no indications are found. This particular embodiment omits two raised indicators 76, and the area is left flush with the main body of target wheel 72. The blank section 78 acts as a rotational index, such that any subsequent processing of the data collected may distinguish between particular impulses. As aforementioned, the target wheel assembly 70 is connected to the crankshaft 25 so that any rotation of crankshaft 25 creates a substantially matching or proportional rotation of target wheel 72. In this particular embodiment, the crankshaft 25 is attached to the target wheel assembly 70 with such timing that blank section 78 correlates to an index cylinder of engine 20 being in top dead center position. As target wheel 72 rotates past blank section 78, engine control features may time engine functions to subsequent rotation readings relative to the known position of blank section 78 and hence the top dead center position of the index cylinder of the engine. Functions which may be calibrated to known cylinder locations include valve timing, spark timing, and fuel injector timing. While this preferred embodiment is pictured utilizing raised indicators 76, many different forms of indication could be used, including depressions in place of the raised indicators 76, notches cut in place of the raised indicators 76, optically recognizable stripes or other patterns, or any other form of indication which could be translated into a data stream from a spinning wheel or shaft. Blank section 78 is utilized in this embodiment as the index indicator, however, it should also be appreciated by those having skill in the art that any non-symmetrical or non-perfectly repeating arrangement of the pattern of indicators used could be utilized to create an index indication.

As the timing of an index cylinder may be correlated to the target wheel 72, so too can the timing of the remaining cylinders. A plurality of crankshaft positions may be used in connection to individual raised indicators 76 and correlated to the known timing of the multiple cylinders of engine 20. In this way, the target wheel assembly 70 may be used in the control of cylinder to cylinder engine functions.

The target wheel 72 is utilized in the control engine functions for engine 20; however, manufacturing variances in a particular vehicle can stack up to create variances in the location of the raised indicators 76 to the angular position of crankshaft 25 and hence the desired index cylinder top dead center position. The sources of these variances include the attachment of target wheel shaft 74 to crankshaft 25, the attachment of target wheel 72 to target wheel shaft 74, variances in the formation of raised indicators 76 upon target wheel 72, the deformation of components of hybrid drive system 10 as a result of stress caused by system wide forces created in the spinning of engine 20, or variances in the operation of sensor 60 or data collection module 50. These variances may be in the form of a variance in the entire target wheel 72 to crankshaft 25, indicating that every raised indicator is out of position by a certain amount, and these variances may additionally be in the form of variances in a particular raised indicator 76 to the target wheel 72 and the index created by blank section 78. In whatever form, the variances could compromise operations of the combustion cycles taking place in engine 20 which are cylinder position dependent. Therefore, it is advantageous if a crankshaft error factor for the entire target wheel 72 or crankshaft error factors for each individual raised indicator 76 are utilized by the engine control device to improve engine timing. In this way, the crankshaft position data taken from target wheel assembly 70 by sensor 60 may be used to improve the performance of engine 20.

As previously mentioned, one source of variances that can reduce the accuracy of the target wheel assembly 70 to the position of crankshaft 25 is the deformation of components of hybrid drive system 10 as a result of stress caused by system wide forces created in the operation of engine 20. At a given engine velocity, some of these forces will always be present but stable. However, other deformation causing forces are variable and could reduce the accuracy of any crankshaft error factor calculations. A primary example of such a variable force is the force of combustion caused by the operation of engine 20. As the fuel-air mix is combusted in the cylinder chamber, a violent reaction takes place. This combustion reaction is variable and can be affected by any number of factors, including but not limited to fuel composition, altitude of the vehicle, the tuned setting of engine 20, and the temperature of the engine block. Because of the highly variable nature of combustion reactions, a known technique for calculating crankshaft error factors was performed by using the combustion of engine 20 to rotate the engine up a certain angular velocity, cut off all fuel to the engine, and take data measurements from target wheel assembly 70 as the engine decelerated without fueled power. While this method accomplished the elimination of combustion reaction forces from the target wheel 72 data measurements, the test had to include interpolation of what the target wheel assembly would do at a steady velocity. As previously mentioned, system-wide forces resulting from the rotation of engine 20 are steady only at a steady or nearly-steady velocity. The data measurements of the known test contained an error related to the deceleration of engine 20 and only yielded a snap-shot picture of crankshaft 25 at a particular engine velocity. A method of calculating crankshaft error factors at a steady or nearly steady engine velocity without any fuel being applied to engine 20 has the advantage of eliminating any error associated with the deceleration of engine 20 and of allowing statistical manipulation of a series of data measurements taken at a constant engine velocity.

Electric motors such as electric motor 30 in hybrid drive system 10 create the potential for rotating crankshaft 25 at a steady or nearly steady engine velocity. As aforementioned, transmission assembly 40 allows the transmission of power in several directions. In this particular embodiment, electric motor 30 provides power to transmission assembly 40, which, in turn, provides power to engine 20 through crankshaft 25. In this way, the crankshaft 25 may be driven within a selected angular velocity range without any fuel being applied to engine 20, and data measured from target wheel assembly 70 may be utilized to calculate crankshaft error factors for that steady engine velocity. While this embodiment utilizes an electric motor 30 supplied as part of hybrid drive system 10 to drive crankshaft 25 in a un-fueled condition, it will be appreciated that the same method could be employed by other means, such as backdriving the engine by attaching an electric motor to an engine 20 and target wheel assembly 70 combination in a manufacturing setting or, in a vehicular application, by the linking of the vehicle to some test apparatus (e.g. a dynamometer) that can act to spin the wheels of the vehicle under external power and backdrive the engine through the final drive and transmission. Additionally, steady state unfueled engine rotation may be achieved by backdriving the engine during vehicle coasting through the transmission. Additionally, the back driven engine speed in hybrid drive configurations may be maintained via the electric motor and transmission gear set.

Figure 4:
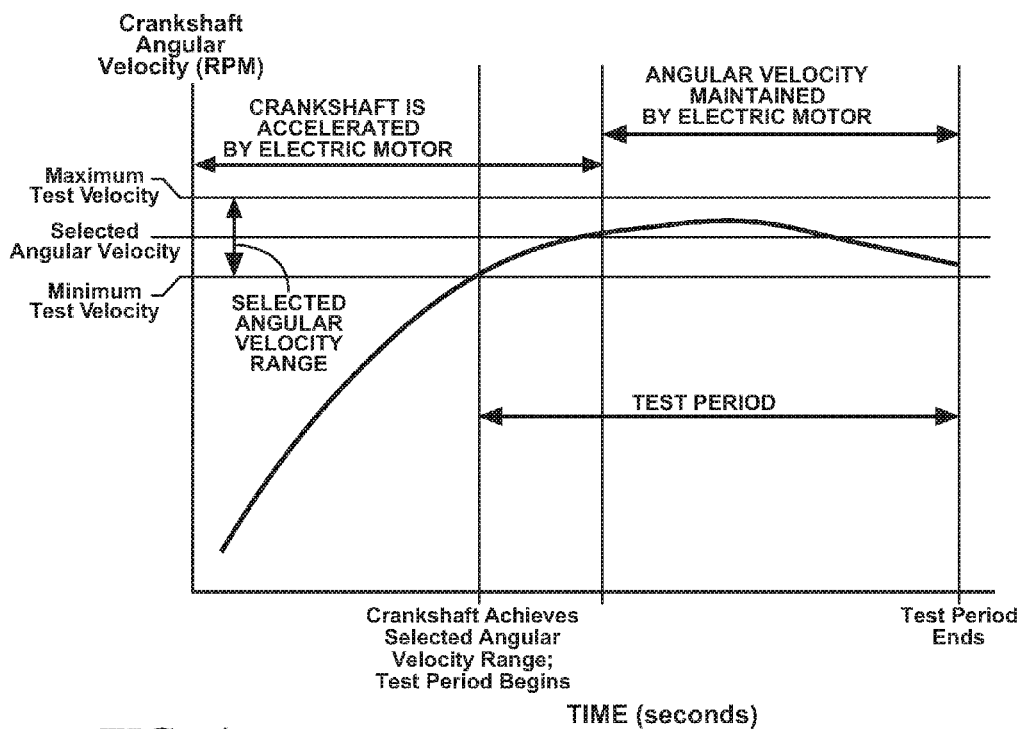
FIG. 4 is a plot of crankshaft angular velocity versus time in accordance with an exemplary embodiment of the present disclosure.

FIG. 4 illustrates a crankshaft error factor test run in accordance with an embodiment of the disclosure. Electric motor 30 is utilized to power engine 20 and crankshaft 25 to a selected angular velocity. An ideal selected angular velocity is chosen based upon test data to perform the crankshaft error factor calculations. No control system is capable of running at a perfectly precise velocity, and some acceptable margin of error must be determined in which the test data can still be accurately representative of a test run at steady angular velocity. This margin of error is utilized in this particular embodiment by defining a selected angular velocity range in which the test is to be run. Once the velocity of crankshaft 25 enters the selected angular velocity range by equaling or exceeding the minimum test velocity, crankshaft position data is collected or flagged as test data. Once the test has begun, a test period of relevant crankshaft position data is defined. The gathering of test data continues until the test period ends by reaching a defined test duration or until the angular velocity data falls outside of the selected angular velocity range. The defined test duration may be set in terms of seconds elapsed, crankshaft revolutions, data samples taken, or any other durational measure. In the event that the test is ended as a result of data falling outside of the selected angular velocity range, the data that was collected prior to the end of the test may either be used or discarded. The gathered data corresponding to the controlled velocity unfueled engine is then processed to determine the crankshaft error factor.

Figure 5:
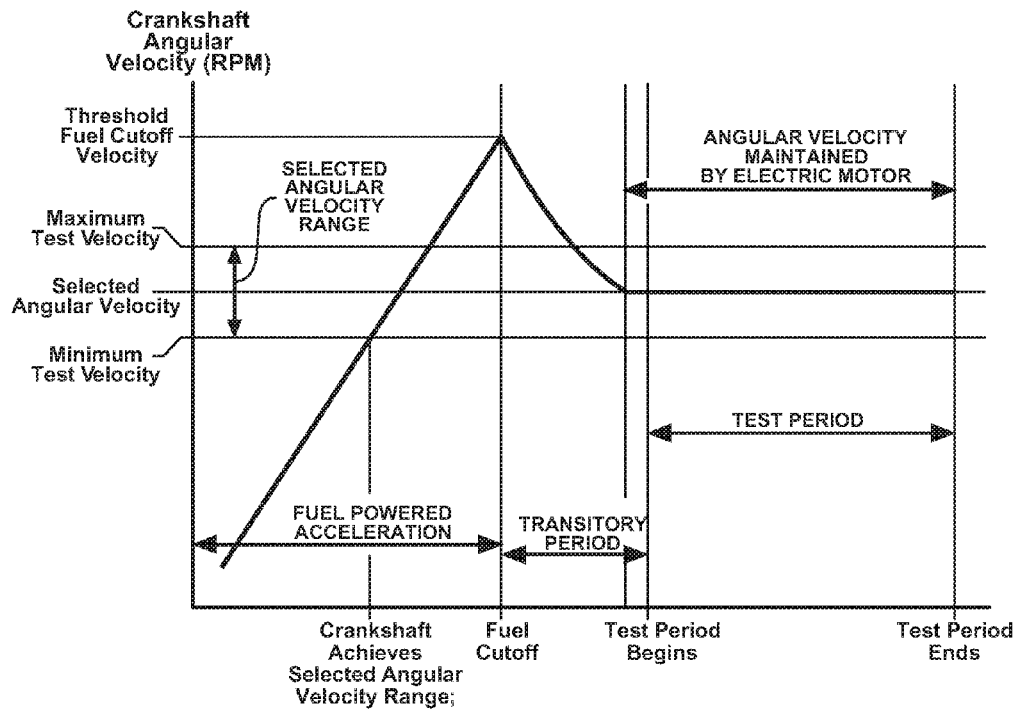
FIG. 5 is a plot of crankshaft angular velocity versus time in accordance with an additional exemplary embodiment of the present disclosure.
Figure 6:
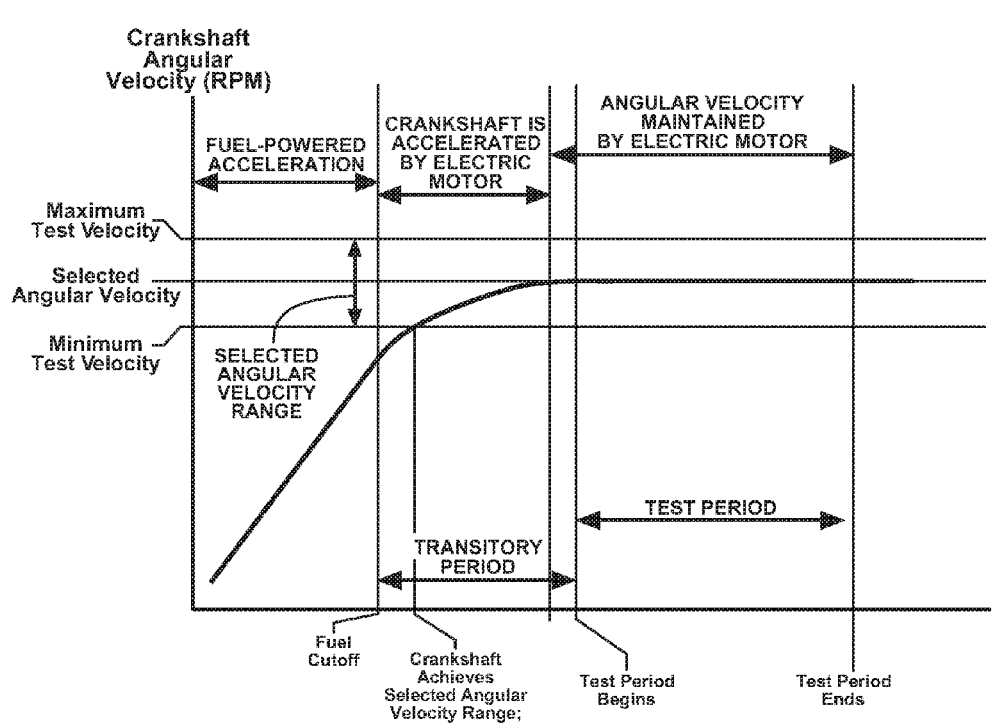
FIG. 6 is a plot of crankshaft angular velocity versus time in accordance with an additional exemplary embodiment of the present disclosure.

FIGS. 5 and 6 illustrate crankshaft error factor tests run in accordance with two additional exemplary embodiments of the disclosure. FIG. 5 represents a test in which engine 20 utilizes fuel to speed crankshaft 25 past the selected angular velocity range, and upon reaching a threshold fuel cutoff velocity, fuel is cut off from engine 20. During this acceleration period, the components of hybrid drive system 10 are subject to variable deformation as a result of the combustion process, as previously described. Upon the engine being cut off from all fuel, the crankshaft then decelerates toward the selected angular velocity range. At some point, electric motor 30 controllably rotates crankshaft 25 through transmission assembly 40, and crankshaft 25 is maintained within the selected angular velocity range. Although the combustion process is no longer applying forces to the components of hybrid drive system 10, the deformation associated with this process does not end immediately. For some transient period, the deformation continues to have appreciable effects upon hybrid drive system 10 after fuel cutoff. In this particular embodiment of the disclosure, the crankshaft error factors determined from data gathered in the test period are more accurate when a transitory period is defined starting at the fuel cutoff event and running for some set duration. All data measurements taken during the transitory period are disregarded, and the test period does not begin until the end of the transitory period. In this way, combustion may be used to accelerate crankshaft 25 without the associated forces causing inaccurate test results.

Similar to the test represented in FIG. 5, FIG. 6 represents a test in which engine 20 utilizes fuel to speed crankshaft 25 to some threshold fuel cutoff velocity. This threshold fuel cutoff velocity may be below or within the selected angular velocity range. Upon reaching the threshold fuel cutoff velocity, fuel is cut off from engine 20, and power is applied by electric motor 30 to turn crankshaft 25. As discussed previously, it is beneficial to define a transitory period after fuel cutoff in order to allow the dissipation of deformation caused by the fueled acceleration. As in previously discussed tests, a test period is defined in which crankshaft position data is measured and used to calculate crankshaft error factors relevant to more efficient operation of engine 20. While FIGS. 5 and 6 represent exemplary embodiments of tests in which engine 20 and electric motor 30 accelerate the crankshaft in separate phases, it should be noted that any combination of sources can be used to accelerate the crankshaft, so long as fuel is cutoff from the engine before the test period begins.

When present, processor 55 may be programmed to perform various functions upon the data collected, including but not limited to storage of raw data, calculation of crank error values calculated as the difference between data gathered from sensor 60 and expected position points generated from design or lookup values, correlation of these crank error values and the selected angular velocity, correlation of crank error values for each cylinder of engine 20 for the selected angular velocity, filtering of the data, and authentication of the data.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for collecting position data of an internal combustion engine crankshaft comprising:
    monitoring crankshaft velocity;
    rotating the crankshaft into a selected angular velocity range;
    maintaining the crankshaft within the selected angular velocity range without any fuel being applied to said engine;
    measuring crankshaft position data while the crankshaft is maintained within the selected angular velocity range; and
    determining a crankshaft error factor based on the measured crankshaft position data.

2. The method of claim 1, wherein rotating the crankshaft comprises rotating the crankshaft by backdriving the engine.

3. The method of claim 2, wherein backdriving the engine comprises backdriving the engine during vehicle coasting.

4. The method of claim 2, wherein the crankshaft is operatively coupled to a hybrid transmission including an electric motor, and backdriving the engine comprises backdriving the engine during vehicle coasting through the hybrid transmission and maintaining the crankshaft within the selected angular velocity range comprises controlling crankshaft speed with the electric motor.

5. The method of claim 2, wherein backdriving the engine comprises backdriving the engine with a dynamometer.

6. The method of claim 1, wherein rotating the crankshaft into the selected angular velocity range comprises rotating the crankshaft into the selected angular velocity range by fueling the engine.

7. The method of claim 1, wherein maintaining the crankshaft within the selected angular velocity range comprises rotating the crankshaft with an electric motor.

8. The method of claim 7, wherein rotating the crankshaft into the selected angular velocity range comprises rotating the crankshaft into the selected angular velocity range with the electric motor.

9. The method of claim 7, wherein said electric motor and said engine are part of a hybrid drive system.

10. The method of claim 1, said measuring staffing after a transitory period.

11. The method of claim 1, said method further comprising processing said crankshaft position data.

12. The method of claim 11, said processing including discarding data points of said crankshaft position data measured during a transitory period.

13. The method of claim 11, said processing including discarding data points of said crankshaft position data measured subsequent to any data point of said crankshaft position data falling outside of said selected angular velocity range.

14. The method of claim 11, said processing including calculation of the crankshaft error factor.

15. The method of claim 11, said processing including calculation of crankshaft error factors for each of a plurality of crankshaft positions.

16. A crankshaft position data measurement system for an internal combustion engine comprising:
    means operative to rotate said crankshaft into a selected angular velocity range;
    means for maintaining the crankshaft within the selected angular velocity range with no fuel being applied to said engine;

a measurement device operative to measure crankshaft position data while the crankshaft is maintained within the selected angular velocity range with no fuel being applied to said engine; and a processor determining crank error values based on the measured crankshaft position data.

17. The system of claim 16, said means operative to rotate said crankshaft into the selected angular velocity range comprising an electric motor.

18. The system of claim 16, said means operative to rotate said crankshaft into the selected angular velocity range comprising said engine operative to accelerate said crankshaft to a fuel cutoff point, and said means for maintaining the crankshaft within the selected angular velocity range comprising an electric motor operative to rotate said crankshaft subsequent to said fuel cutoff point.

19. The system of claim 18, said measurement device operative to measure said crankshaft position data during a transitory period after said fuel cutoff point.

20. The system of claim 16, said means operative to rotate said crankshaft into the selected angular velocity range comprising means for backdriving the engine.

* * * * *